US009236658B2

(12) United States Patent
Charrat

(10) Patent No.: US 9,236,658 B2
(45) Date of Patent: Jan. 12, 2016

(54) NFC ANTENNA WITH INTERLEAVED COILS

(71) Applicant: INSIDE Secure, Aix-en-Provence (FR)

(72) Inventor: Bruno Charrat, Aix-en-Provence (FR)

(73) Assignee: INSIDE SECURE, Aix-en-Provence (FR)

( * ) Notice: Subject to any disclaimer, the term of this patent is extended or adjusted under 35 U.S.C. 154(b) by 235 days.

(21) Appl. No.: 13/743,769

(22) Filed: Jan. 17, 2013

(65) Prior Publication Data

US 2013/0181875 A1    Jul. 18, 2013

(30) Foreign Application Priority Data

Jan. 18, 2012 (FR) ..................... 12 50502

(51) Int. Cl.
*H01Q 7/00* (2006.01)
*H04B 5/00* (2006.01)
*H01Q 1/22* (2006.01)

(52) U.S. Cl.
CPC ............. *H01Q 7/005* (2013.01); *H04B 5/0087* (2013.01); *H01Q 1/2225* (2013.01)

(58) Field of Classification Search
CPC ... H01Q 7/005; H01Q 1/2225; H04B 5/0087; H04B 5/0093
USPC ........................................................ 343/748
See application file for complete search history.

(56) References Cited

U.S. PATENT DOCUMENTS

| 2005/0001779 A1* | 1/2005 | Copeland et al. ............. 343/867 |
| 2005/0212707 A1* | 9/2005 | Egbert et al. .................. 343/702 |
| 2011/0266883 A1 | 11/2011 | Eray |
| 2012/0086556 A1 | 4/2012 | Ikemoto |

FOREIGN PATENT DOCUMENTS

| EP | 2393215 A1 | 12/2011 |
| JP | 2000-278172 A | 10/2000 |
| WO | 2010066955 A1 | 6/2010 |
| WO | 2011055702 A1 | 5/2011 |

OTHER PUBLICATIONS

Search Report issued Sep. 3, 2012 in FR Application No. 1250502.
International Standards Organization, "ISO/IEC 14443 Final Committee Draft: Identification cards—Contactless integrated circuit(s) cards—Proximity Cards. Part 1: Physical Characteristics", 8 pages (1997).
International Standards Organization, "ISO/IEC 14443 Final Committee Draft: Identification cards—Contactless integrated circuit(s) cards—Proximity Cards. Part 2: Radio frequency power and signal interface", 16 pages (1999).
International Standards Organization, "ISO/IEC 14443 Final Committee Draft: Identification cards—Contactless integrated circuit(s) cards—Proximity Cards. Part 3: Initialization and anticollision", 48 pages (Jun. 11, 1999).

(Continued)

*Primary Examiner* — Sue A Purvis
*Assistant Examiner* — Michael Bouizza

(57) ABSTRACT

An antenna circuit for near-field communications includes a planar active winding, connected between a first and a second access terminal; an auxiliary winding coplanar with the active winding and connected by a first end to the first access terminal; and a tuning capacitor connected to the second end of the auxiliary winding. The turns of the active and auxiliary windings are interleaved.

9 Claims, 3 Drawing Sheets

(56) References Cited

OTHER PUBLICATIONS

International Standards Organization, "ISO/IEC 14443 Final Committee Draft: Identification cards—Contactless integrated circuit(s) cards—Proximity Cards. Part 4: Transmission protocol", 39 pages (Mar. 10, 2000).

International Standards Organization, "ISO/IEC 15693 Final Committee Draft: Identification cards—Contactless integrated circuit(s) cards—Vicinity Integrated Circuit(s) Card. Part 1: Physical characteristics", 13 pages (2010).

International Standards Organization, "ISO/IEC 15693 Final Committee Draft: Identification cards—Contactless integrated circuit(s) cards—Vicinity Integrated Circuit(s) Card. Part 2: Radio frequency power and signal interface", 16 pages (Mar. 9, 1999).

International Standards Organization, "ISO/IEC 15693 Final Committee Draft: Identification cards—Contactless integrated circuit(s) cards—Vicinity Integrated Circuit(s) Card. Part 3: Anti-collision and transmission protocol", 50 pages (Mar. 10, 2000).

* cited by examiner

NFC ANTENNA WITH INTERLEAVED COILS

BACKGROUND OF THE INVENTION

Embodiments of the invention relate to Near-Field or NFC communication devices, and more particularly to the antenna circuits used in such devices.

FIGS. 1A to 1C represent various known electrical structures of antenna circuits. These antenna circuits are usable in active NFC devices able to create a magnetic field and to detect its modulation (for example an RFID tag reader), and in passive NFC devices (for example an RFID tag) powered by a magnetic field and configured to modulate this field in order to transmit data.

FIG. 1A illustrates the structure most generally used in NFC devices. It includes a single winding L1 connected in parallel with a tuning capacitor C. The antenna circuit is tuned, for example, to 13.56 MHz within the framework of the NFC standards in force (e.g. ISO 14443, ISO 15693). The terminals of the winding form the access terminals A1, A2 of the antenna circuit.

The turns of the antenna windings of NFC devices are generally produced in the form of metallic tracks etched spirally in a single layer of a flexible printed circuit. The windings are plane and coplanar. This makes it possible to minimize the cost of manufacture, but entails certain difficulties due to the fact that the turns are all of different dimensions and therefore do not have similar characteristics.

FIG. 1B illustrates an optimized structure, described for example in Japanese patent application JP 2000-278172. The antenna winding includes a midpoint forming one of the access terminals (A1) of the antenna circuit. It is considered that the antenna winding is formed of two windings connected in series L1 and L2, the access terminals A1 and A2 being taken at the terminals of the winding L1, which will be referred to as the "active winding". The winding L2 will be referred to as the auxiliary winding. These terminals A1, A2 are generally connected to an NFC circuit (not shown), which may be a passive circuit (receiving the magnetic field emitted by another NFC device) or an active circuit (emitting the magnetic field).

As indicated in the aforementioned document, this structure makes it possible to increase the number of turns of the antenna winding and consequently to increase the energy received or emitted by means of the winding by the NFC circuit connected to the terminals A1, A2, while decreasing the number of turns seen by the NFC circuit, so that the impedance of the coil seen from the terminals A1, A2 is closer to the output impedance of the NFC circuit, thereby improving the quality factor Q of the antenna circuit.

FIG. 1C illustrates an alternative structure to that of FIG. 1B. The antenna winding includes two midpoints forming the access terminals A1 and A2, also connected to an NFC circuit. It is considered that the antenna winding is formed of three windings connected in series L1, L2 and L3, the access terminals A1 and A2 being taken at the terminals of the winding L1. The winding L1 is the active winding, and the windings L2 and L3 are auxiliary.

FIG. 2A schematically represents a conventional spatial configuration of the antenna circuit of FIG. 1B. The whole antenna winding is coiled in a spiral, in a single plane. To simplify the drawing, it is assumed that the winding L1 includes one turn and the winding L2 two turns. The antenna winding thus includes three turns. The inner turn, shown in solid line, is that of winding L1 and the two outer turns, shown in dotted lines, are those of winding L2.

FIG. 2B schematically represents a conventional spatial configuration of the antenna circuit of FIG. 1C. As previously, the whole antenna winding is coiled in a spiral, in a single plane. To simplify the drawing, it is assumed that each winding L1 to L3 includes a single turn. The antenna winding thus includes three turns. The inner turn, shown in dotted line, is that of winding L2 and the outer turn, shown in chain dotted line, is that of winding L3. The middle turn, shown in solid line, is that of the active winding L1.

It has been demonstrated that the circuit of FIG. 1B achieved according to the spiral spatial configuration of FIG. 2A offers, in terms of communication distance, lower performance than that of the circuit of FIG. 1C achieved with the same dimensions according to the same spiral spatial configuration (FIG. 2B).

BRIEF SUMMARY OF THE INVENTION

There is a need to improve the effectiveness of these antenna circuits.

This need may be satisfied by providing an antenna circuit for near-field communications including a planar active winding, connected between a first and a second access terminal; an auxiliary winding coplanar with the active winding and connected by a first end to the first access terminal; and a tuning capacitor connected to the second end of the auxiliary winding. The turns of the active and auxiliary windings are interleaved.

According to one embodiment, a first part of the turns of the auxiliary winding is situated inside the active winding, and a second part of the turns of the auxiliary winding is situated outside the active winding.

According to one embodiment, a first part of the turns of the active winding is situated inside the auxiliary winding, and a second part of the turns of the active winding is situated outside the auxiliary winding.

According to one embodiment, each turn of the active winding is flanked by two turns of the auxiliary winding, adjacent respectively on the inside and on the outside.

According to one embodiment, the antenna circuit includes a second auxiliary winding coplanar with the active winding, connected between the capacitor and the second access terminal, the active winding comprising a group of turns interleaved with the turns of the first auxiliary winding, and a group of distinct turns interleaved with the turns of the second auxiliary winding.

According to one embodiment, the auxiliary windings are situated in two disjoint respective zones of one and the same plane.

A passive near-field communication device may include an antenna circuit of the abovementioned type and a circuit for modulating the impedance between the access terminals of the antenna circuit.

An active near-field communication device may include an antenna circuit of the abovementioned type and an excitation circuit connected to the access terminals of the antenna circuit.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments will be set forth in the following nonlimiting description, given in conjunction with the appended figures among which, in the drawings.

DETAILED DESCRIPTION OF THE INVENTION

Figure 1A:
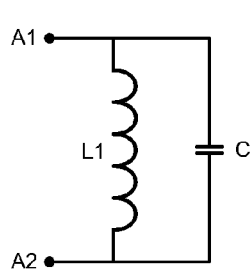
FIGS. 1A to 1C, previously described, represent electrical structures of conventional antenna circuits.
Figure 1B:
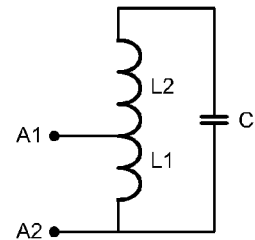
Figure 1C:
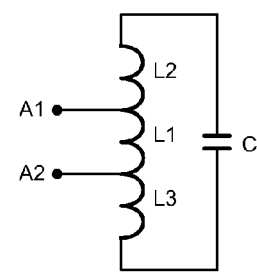
Figure 2A:
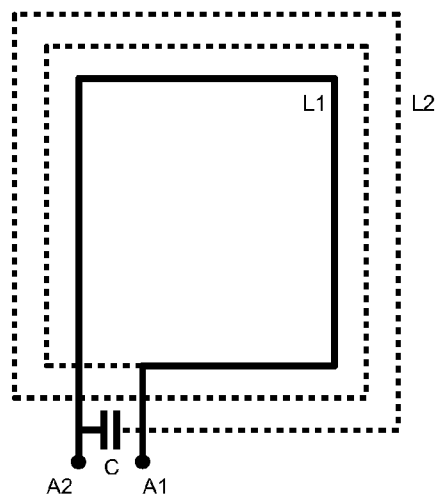
FIG. 2A, previously described, represents a spatial configuration of the antenna circuit of FIG. 1B.
Figure 2B:
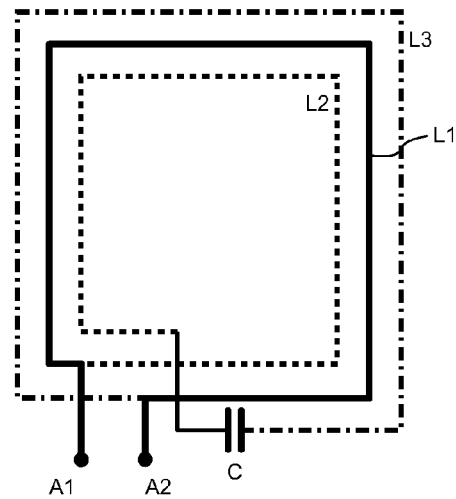
FIG. 2B, previously described, represents a spatial configuration of the antenna circuit of FIG. 1C.

As indicated previously, it has been demonstrated by use that the spatial configuration of the antenna circuit of FIG. 2B, which implements the electrical circuit of FIG. 1C, is more effective, in terms of communication distance for equal antenna dimensions, than that of FIG. 2A, which implements the antenna circuit of FIG. 1B.

The structures of the antennas of FIGS. 1B and 1C being equivalent from a purely electrical point of view, it is assumed that the difference in effectiveness is related to the difference in the spatial configurations conventionally used to produce these types of antennas. Spatial configurations able to improve the effectiveness are studied here.

Figure 3:
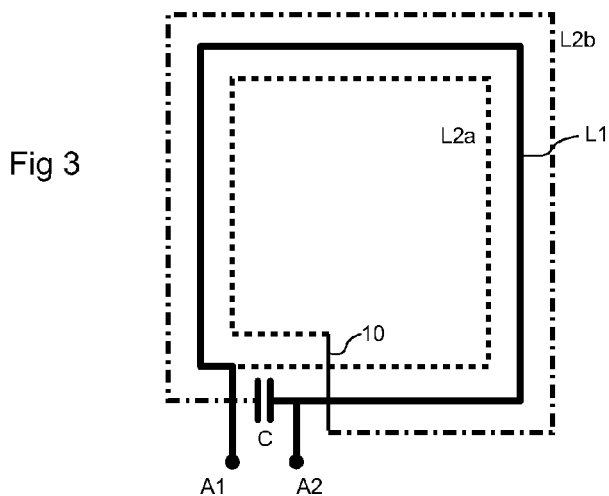
FIG. 3 represents an exemplary spatial configuration of an antenna circuit of alternative structure.

FIG. 3 illustrates a modification of the electrical structure of the antenna of FIG. 2A which retains the spatial configuration of FIG. 2B. The capacitor C of FIG. 2B is replaced with an electrical conductor 10, and a capacitor C is inserted in the connection of turn L3 to terminal A2.

It turns out that the electrical structure thus obtained is that of FIG. 1B, with an auxiliary winding L2 including more turns than the active winding L1. Furthermore, a portion L2a of the turns of the winding L2 (one turn in FIG. 3) is situated inside the winding L1, and the remaining portion L2b of the turns of the winding L2 (one turn in FIG. 3) is situated outside the winding L1.

Stated otherwise, the turns of the windings L1 and L2 are interleaved, rather than being coiled in a regular spiral.

Figure 4:
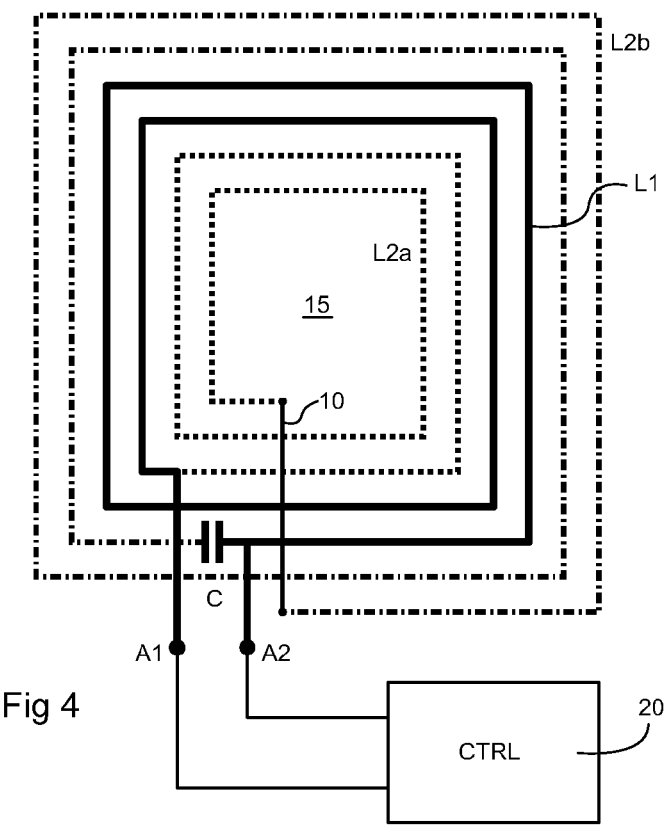
FIG. 4 represents an exemplary spatial configuration for an antenna winding having an even number of turns.

FIG. 4 represents a spatial configuration based on the same principle as that of FIG. 3, having a two-turn winding L1, and a four-turn winding L2. The winding L2 is separated into two portions L2a and L2b, the portion L2a comprising two adjacent turns inside the active winding L1, and the portion L2b comprising two adjacent turns outside winding L1. The partial winding L2a and winding L1 are coiled clockwise one after the other in a regular spiral from the inside towards the outside. At the inside, the end of winding L2a is connected by conductor 10 to an end of winding L2b. Starting from this end, the winding L2b is coiled anti-clockwise from the outside towards the inside. The winding L2b terminates upon capacitor C connected to terminal A2.

Through this choice of the winding directions, the series current in the antenna winding flows in the same direction in all the turns. According to an alternative of the configuration of FIG. 4, retaining the direction of the current, the partial winding L2b could be coiled clockwise from the inside towards the outside, from the end connected to the conductor 10.

In practice, preferably, all the turns are produced in one and the same layer of a substrate 15, such as a flexible printed circuit, and the conductor 10, which crosses the turns radially, is produced in a different layer of the substrate and connected to the corresponding ends of the turns by vias. The same goes for conductors serving to offset the access terminals A1 and A2 towards the periphery of the structure, and for the connections of capacitor C.

The terminals A1 and A2 are connected to a circuit 20 for managing the NFC device, which integrates the antenna circuit. It may be a passive device, such as an RFID tag, in which case the circuit 20 is designed to draw its power supply from the magnetic field sensed by the antenna and to modulate the impedance between the terminals A1 and A2 in order to transmit information. In the case where the NFC device is active, the circuit 20 is designed to excite the antenna through the terminals A1 and A2 so as to create a magnetic field, and to detect modulations of this field that are caused by other NFC devices within the range of the field.

Trials have been conducted on two antennas of like characteristics in terms of dimensions and total number of turns, one produced according to the spatial configuration of FIG. 4, and the other according to the spatial configuration of FIG. 2B (with three windings having two turns). These two antennas have turned out to be equivalent, for equal dimensions, in terms of communication distance with various conventional types of RFID tags.

The effectiveness of an antenna of the type of FIG. 1B is therefore successfully improved by modifying its spatial structure in such a way that the turns of the windings L1 and L2 are interleaved.

An antenna of the type of FIG. 1B, 3 or 4, is easier to produce and to implement than an antenna of the type of FIG. 1C. Indeed, it exhibits three points of connection to the windings instead of four, counting the two connections to the access terminals A1, A2 and the connection of the auxiliary winding L2 to a first terminal of the capacitor. The second terminal of the capacitor and the terminal A2 are grounded instead of being floating.

The antenna windings described up till now have a ratio 1:3 (between the number of turns of the active winding L1 and the total number of turns of the antenna winding). It is desirable to produce other ratios. In the structure of FIG. 4, it is accordingly possible to vary the number of turns of the partial windings L2a and L2b independently of the number of turns of winding L1, or vice versa, without affecting the generic configuration of the antenna circuit.

Figure 5:
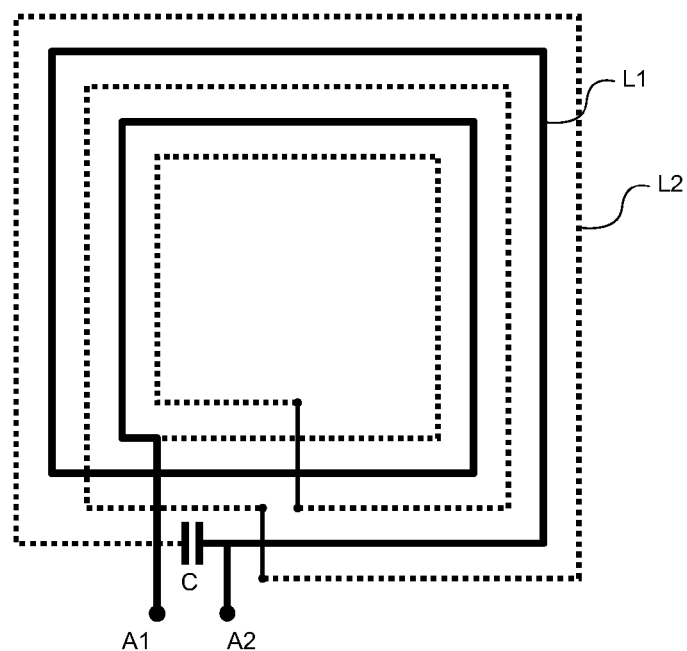
FIG. 5 represents an exemplary spatial configuration for an antenna winding having an odd number of turns.

FIG. 5 illustrates an alternative configuration suited to an odd total number of turns, notably for the case where winding L1 has one turn less than winding L2. The example represented corresponds to a winding L1 of two turns and a winding L2 of three turns. In this case, rather than separating the winding L2 into two unequal parts (which nevertheless remains conceivable in the structure of FIG. 4), each turn of winding L1 is spatially alternated with a turn of winding L2. Each turn of the winding L1 is thus flanked by two turns of winding L2, adjacent respectively on the inside and on the outside.

Figure 6A:
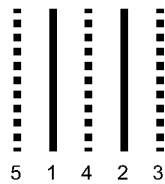
FIGS. 6A to 6C symbolize several possibilities of interleaving of turns.
Figure 6B:
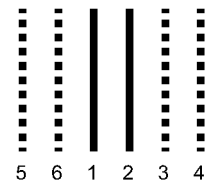
Figure 6C:
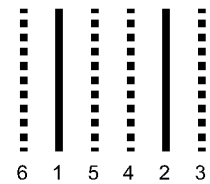

FIGS. 6A to 6C summarize various elementary possibilities of interleaving of turns offered according to the numbers of turns of windings L1 and L2. The vertical lines represent the spatial arrangement of the turns. From left to right the turns are represented from the outside towards the center of the antenna winding. The solid lines correspond to the turns of the active winding L1, and the dotted lines correspond to the turns of the auxiliary winding L2. The numbers under the lines designate the order of winding.

FIG. 6A corresponds to the case of FIG. 5, that is to say an odd total number of turns. The two turns of winding L1 are wound consecutively in spatial positions 2 and 4, and the winding of the three turns of winding L2 is continued in spatial positions 5, 3 and 1.

FIG. 6B corresponds to the case of FIG. 4, that is to say an even total number of turns. The two turns of winding L1 are wound consecutively in spatial positions 3 and 4, and the winding of the four turns of winding L2 is continued in spatial positions 5, 6, 1 and 2.

FIG. 6C is an alternative of FIG. 6B. The two turns of winding L1 are separated spatially by two turns of winding L2. More specifically, the turns of winding L1 are coiled in spatial positions 2 and 5, and then the turns of winding L2 are coiled in spatial positions 6, 4, 3 and 1.

The interleaved spatial configurations illustrated by FIGS. 6A to 6C tend to reduce the mean radial distance between the turns of the auxiliary winding L2 and the turns of the active winding L1, the consequence of which is an improvement in the coupling coefficient between the active and auxiliary windings. For this same reason, the alternatives of FIGS. 6A and 6C offer better effectiveness than that of FIG. 6B, since the turns of the active winding L1 are better distributed among the turns of the auxiliary winding L2.

The orders of winding indicated in FIGS. 6A to 6C are given by way of example. What matters is the spatial position of the turns, so that the turns of the windings L1 and L2 are interleaved. The order of winding will be chosen, preferably, so as to decrease the number of turn crossings, which require conductors in a second substrate layer and vias.

Depending on the ratios to be obtained and the numbers of turns of the windings, it will be possible to duplicate the patterns of FIGS. 6A to 6C or else combine them within one and the same antenna winding. Each line shown in the Figs. can furthermore represent multiple turns of one and the same winding and the number of turns per line may be different for the two windings.

Figure 7:
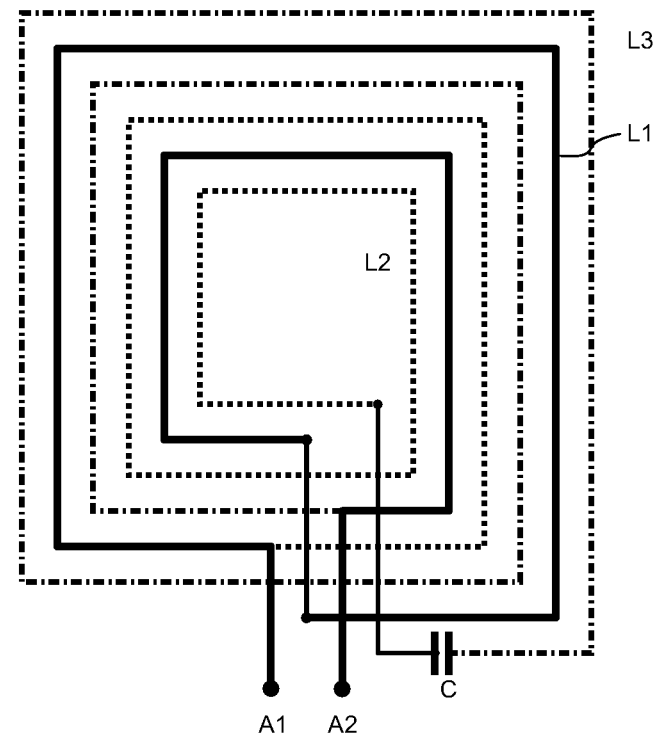
FIG. 7 represents an exemplary interleaved spatial configuration applicable to an antenna of the type of FIG. 1C.

FIG. 7 represents an exemplary application of the interleaving to an antenna winding of the type of FIG. 1C, comprising three windings L1, L2 and L3, each of two turns. The winding L1 is the active winding, and the windings L2 and L3 are auxiliary. This structure is similar to that of FIG. 6C, the two halves of which correspond respectively to the auxiliary windings L2 and L3. The turns are coiled clockwise starting from the inside. Going from the inside towards the outside are found, successively, a first turn of winding L2, a first turn of winding L1, the second turn of winding L2, a first turn of winding L3, the second turn of winding L1, and then the second turn of winding L3.

The free ends of the first turn of winding L2 (at the center) and of the second turn of winding L3 (on the outside) are linked by capacitor C. The two turns of winding L1 are connected by a radial conductor in a second layer. The two ends of winding L1 are connected to the access terminals A1 and A2.

Thus, a first group of turns of winding L1 is interleaved with the turns of winding L2, and a second group formed of the remaining turns of winding L1 is interleaved with the turns of winding L3. This spatial configuration improves the effectiveness of the antenna with respect to the conventional spatial configuration of FIG. 2B. By contrast, the auxiliary windings do not include any interleaved turns—they are situated in disjoint zones of the plane of the antenna winding.

It is appreciated that each of the windings L2 and L3, associated with the group of turns of winding L1 which is assigned to it, plays the same role as the lone winding L2 associated with winding L1 as a whole in the two-winding configurations. Thus, it is possible to apply combinations of the configurations of FIGS. 6A to 6C to each of the windings L2 and L3, and the associated half of the winding L1.

Numerous variants and modifications of the embodiments described here will be apparent to the person skilled in the art. A tuning capacitor connected to the terminals of the antenna winding as a whole has for example been described. The capacitor could also be connected to the terminals of the auxiliary winding. Moreover, in the diverse examples described, the auxiliary winding has more turns than the active winding, thereby corresponding to the more common use cases. It is nonetheless conceivable for the active winding to have more turns than the auxiliary winding, in which case the spatial roles of these two windings are reversed in the examples described.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An antenna circuit for near-field communications comprising:
   a planar active winding including at least one turn of a continuous conductor connected between a first and a second access terminal;
   a first auxiliary winding coplanar with the active winding and including multiple turns of a continuous conductor connected by a first end to the first access terminal, a second end of the auxiliary winding being coupled to the second access terminal through a tuning capacitor,
   wherein the planar active winding and the first auxiliary winding have interleaved turns, a portion of the continuous conductor of the first auxiliary winding crossing a portion of the continuous conductor of the planar active winding, and wherein each turn represents a loop.

2. The antenna circuit according to claim 1, in which a first part of the turns of the first auxiliary winding is situated inside the active winding, and a second part of the turns of the first auxiliary winding is situated outside the active winding.

3. The antenna circuit according to claim 1, in which each turn of the active winding is flanked by two turns of the first auxiliary winding, adjacent respectively on the inside and on the outside.

4. The antenna circuit according to claim 1, further comprising a second auxiliary winding coplanar with the active winding and including multiple turns of a continuous conductor connected between the tuning capacitor and the second access terminal, the active winding further comprising a group of turns interleaved with the turns of the first auxiliary winding, and a group of distinct turns interleaved with the turns of the second auxiliary winding.

5. The antenna circuit according to claim 4, in which the first and second auxiliary windings are situated in two disjoint respective zones of one and the same plane.

6. A passive near-field communication device comprising:
   an antenna circuit comprising:
   a planar active winding including at least one turn of a continuous conductor connected between a first and a second access terminal;

an auxiliary winding coplanar with the active winding and including multiple turns of a continuous conductor connected by a first end to the first access terminal, a second end of the auxiliary winding being coupled to the second access terminal through a tuning capacitor, wherein the turns of the active and auxiliary windings are interleaved, wherein a portion of the continuous conductor of the auxiliary winding crosses a portion of the continuous conductor of the planar active winding, and wherein each turn represents a loop; and a circuit for modulating an impedance between the first and second access terminals.

7. An active near-field communication device comprising:
an antenna circuit comprising:
a planar active winding including at least one turn of a continuous conductor connected between a first and a second access terminal;
an auxiliary winding coplanar with the active winding and including multiple turns of a continuous conductor connected by a first end to the first access terminal, a second end of the auxiliary winding being coupled to the second access terminal through a tuning capacitor,
wherein the turns of the active and auxiliary windings are interleaved, wherein a portion of the continuous conductor of the auxiliary winding crosses a portion of the continuous conductor of the planar active winding, and wherein each turn represents a loop; and
an excitation circuit connected to the access terminals.

8. An antenna circuit for near-field communications comprising:
a planar active winding including multiple turns of a continuous conductor connected between a first and a second access terminal;
a first auxiliary winding coplanar with the active winding and including at least one turn of a continuous conductor connected by a first end to the first access terminal, a second end of the auxiliary winding being coupled to the second access terminal through a tuning capacitor,
wherein the planar active and first auxiliary windings have interleaved turns, wherein each turn represents a loop, and wherein a portion of the continuous conductor of the planar active winding crosses a portion of the continuous conductor of the first auxiliary winding.

9. The antenna circuit according to claim 8, in which a first part of the turns of the active winding is situated inside the first auxiliary winding, and a second part of the turns of the active winding is situated outside the first auxiliary winding.

* * * * *